United States Patent [19]

Gupta

[11] Patent Number: 4,515,992
[45] Date of Patent: May 7, 1985

[54] CABLE WITH CORROSION INHIBITING ADHESIVE

[75] Inventor: Chakra V. Gupta, Hickory, N.C.

[73] Assignee: CommScope Company, Catawba, N.C.

[21] Appl. No.: 493,375

[22] Filed: May 10, 1983

[51] Int. Cl.³ ............................................. H01B 7/28
[52] U.S. Cl. .................................. 174/102 R; 156/51; 174/107; 174/110 S; 428/380; 428/447
[58] Field of Search ............... 174/102 R, 107, 110 S; 156/51; 428/380, 447; 523/173; 524/114, 188, 262, 264

[56] References Cited

U.S. PATENT DOCUMENTS

| | | | |
|---|---|---|---|
| 3,085,908 | 4/1963 | Morehouse | 427/387 X |
| 3,272,912 | 9/1966 | Jachimowicz | 174/102 R |
| 3,379,607 | 4/1968 | Foster et al. | 428/447 |
| 3,567,846 | 3/1971 | Brorein | 174/102 R |
| 3,681,515 | 8/1972 | Mildner | 174/102 SC X |
| 3,736,283 | 5/1973 | Taylor, Jr. | 524/262 |
| 3,847,860 | 11/1974 | Seiler | 524/262 |
| 4,077,932 | 3/1978 | Columbus | 524/114 |
| 4,107,354 | 8/1978 | Wilkenloh et al. | 174/102 R X |
| 4,133,789 | 1/1979 | Lakshmanan | 524/188 X |

FOREIGN PATENT DOCUMENTS

| | | | |
|---|---|---|---|
| 2199549 | 4/1974 | France | 524/114 |
| 138726 | 10/1980 | Japan | 428/447 |

OTHER PUBLICATIONS

Hawley, G. G., Condensed Chemical Dictionary, Eighth Edition, Van Nostrand Reinhold Co., 1971, p. 782.

Primary Examiner—A. T. Grimley
Assistant Examiner—Morris H. Nimmo
Attorney, Agent, or Firm—Bell, Seltzer, Park & Gibson

[57] ABSTRACT

An improved cable having a metallic inner conductor, a dielectric material surrounding the inner conductor and a metallic outer conductor or sheath comprises corrosion inhibiting adhesive disposed at the interface between at least one of the metallic conductors and the dielectric. The adhesive composition comprises a polyfunctional silane compound reacted with the metallic surface of the conductor and providing corrosion resistance thereto while also promoting bonding between the conductor and the dielectric.

18 Claims, 3 Drawing Figures

CABLE WITH CORROSION INHIBITING ADHESIVE

FIELD AND BACKGROUND OF THE INVENTION

This invention relates to an improvement in electrical cables, especially electrical cables of the type utilized for transmission of high frequency signals, such as radio and television signals. Cables of this type have one or more inner conductors, usually formed of copper or copper-clad aluminum, with the inner conductor or conductors being surrounded by a dielectric material, such as expanded or unexpanded polyethylene, polypropylene or polystyrene. The dielectric material, in turn, is surrounded by a metallic outer conductor, typically a metal tube or metallic foil. The metallic outer conductor, in addition to serving as an electrical conductor, also serves to shield the cable against leakage of RF radiation and to seal the cable against ingress of contaminants, such as moisture, which may undesirably affect the electrical characteristics of the dielectric or cause corrosion of the conducting surfaces of the inner and/or outer conductor.

In this regard, it is well recognized that corrosion of the metallic conductors is highly deleterious to the RF propagation characteristics of the cable. At the high frequencies normally used in such cables, due to the phenomenon known as the "skin effect", the R.F. electrical signals are conducted entirely along the conducting surfaces or skin of the inner and outer conductors. Any disruption of these surfaces, such as would occur due to corrosion or pitting of the conductor, increases the signal loss of the cable. This condition of corrosion, should it occur at the interface between the conductor and a terminating connector, can further contribute to the intermodulation of R.F. carriers being transmitted along a coaxial cable in a FDM (frequency division multiplex) system. This is particularly true at higher frequencies (greater than 300 MHz) where the entirety of the RF power would otherwise reside within the dimensions of the contaminating oxide. Furthermore, where the inner and outer conductor contributes significantly to the mechanical and physical behavior of the cable, the presence of corrosion will deteriorate the strength and fatigue behavior of the cable construction. This deterioration may permit the ingress of contaminating moisture into the dielectric resulting in disrupted transmission, the ingress of ambient RF energy into the coax, or more seriously the egress of transmitted RF power which is capable of interfering with ambient communication, navigational or control signals.

In an effort to protect the conductors against corrosion, a common prior practice in the commercial production of coaxial cables has been to provide a protective adhesive coating on the conductor which forms a physical barrier to water or water vapor. Typically the adhesive employed is a copolymer of ethylene with an ethylenically unsaturated carboxylic acid, usually acrylic acid, as is disclosed for example in prior U.S. Pat. Nos. 3,272,912; 3,681,515; and 4,107,354. The adhesive coating, in addition to excluding moisture and protecting the conductor surface against corrosion, also serves to adhesively bond the conductor to the adjacent dielectric material to contribute to the physical properties of the cable. The use of ethylene acrylic acid (EAA) adhesives in this manner is widely practiced in the industry.

In spite of the widespread commercial use of this adhesive, certain significant problems are presented thereby. Although the EAA adheres quite tenaciously to the inner conductor, it is not totally effective in preventing moisture from coming into contact with the conductor. Thus, the EAA coating still allows some corrosion of the inner conductor, particularly at the ends of the cable. This is especially true in situations where the concentrations of EAA have been diluted to promote the removal of the adhesive coating. Additionally, since the adhesive can bond so strongly to the inner conductor, it is difficult, during installation, to strip the adhesive from the conductor when installing connectors. Unless the adhesive is properly stripped from the conductor, a poor connection can occur. This poor connection can be manifested by intermittent open circuits, inability to transmit higher power levels, selective performance with frequency, or the nonlinear transport of signals resulting in intermodulation. Further the EAA adhesive, being a polar molecule, produces increased electrical dissipation in the cable at the high frequencies of the signals carried by the cable. In recognition of this, in commercial practice, attempts are made to minimize the dissipation or loss contributed by the EAA adhesive by applying the minimum possible thickness of EAA adhesive to the center conductor. However, even at these minimal levels, the effect of the EAA adhesive is measurable.

SUMMARY OF THE INVENTION

The present invention departs from the approach utilized heretofore in the production of coaxial cables for protecting the metallic conductors from corrosion. Rather than attempting to protect the conductor from corrosion solely by physically excluding moisture with an adhesive coating, the present invention employs an entirely new adhesive system at the interface between the conductor and the dielectric which, in addition to physically excluding moisture, also chemically reacts with the metallic surface to impart corrosion resistance thereto, This adhesive system has a number of very significant advantages over prior adhesive systems, such as the EAA adhesives noted above. This adhesive system can be more easily removed from the conductor so that better electrical properties are obtained where connectors are installed. In addition, the metallic surface of the conductor remains protected against corrosion, even in the areas where the adhesive has been stripped for installing connectors. In the area of the conductor where the adhesive coating has been removed for connectorization, the problem of corrosion becomes much more significant than the associated increase in signal attenuation resulting from one to two inches of corrosion. Should corrosion occur at the electrical interface between conductor and connector, the junction will develop non-linear transport characterizations. This alteration in the V-I (voltage-current) characteristics will intermodulate frequencies being transmitted along the cable. On coaxial cables with expanded bandwidth, upwards of 150 frequency division multiplexed carriers can reside simultaneously. The result of all modes of their intermodulation products can render selected frequency bands of cable unserviceable and/or deteriorate the S/N ratio (signal to noise) throughout the entirety of the cable spectrum.

The adhesive system of the present invention utilizes a polyfunctional silane compound which has functional groups which chemically react with the metallic surface of the conductor to render the metal corrosion resistant, while also promoting adhesive bonding between the metal surface and the dielectric. The silane compound may be mixed with a suitable carrier or extender material to facilitate application to the conductor. To minimize high frequency dissipation, the carrier or extender material desirably has a relatively non-polar molecular structure. It is especially suitable that the carrier or extender material itself may have adhesive characteristics and contribute to bonding between the metallic conductor and the dielectric material. Particularly useful for this purpose are polymers or copolymers having linear hydrocarbon segments in the molecular structure thereof.

Thus broadly stated, the present invention is directed to a cable which comprises at least one metallic inner conductor, a dielectric material surrounding the at least one inner conductor, a metallic outer conductor surrounding the dielectric material and the at least one inner conductor, and a coating disposed at the interface between at least one of the conductors and said dielectric material and forming an adhesive bond therebetween and also serving to prevent corrosion of the metallic conductor, said coating comprising a polyfunctional silane compound reacted with the metallic surface of the conductor and providing corrosion resistance thereto and also cooperating with said dielectric material to promote bonding between the conductor and the dielectric material.

BRIEF DESCRIPTION OF THE DRAWINGS

Some of the features and advantages of the invention having been stated, others will become apparent as the description proceeds, when taken in connection with the accompanying drawings, in which.

DETAILED DESCRIPTION

Figure 1:
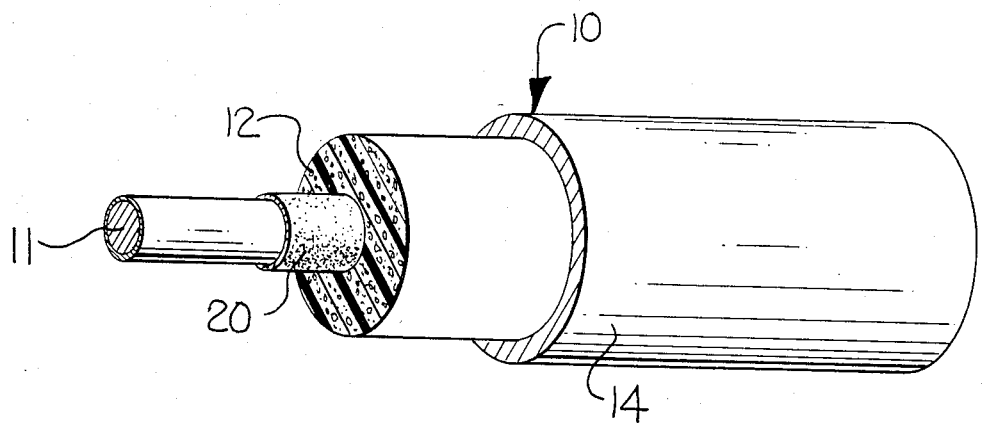
FIG. 1 is an exploded perspective view showing one form of a coaxial cable in accordance with the invention.

Polyfunctional organosilane compounds which are useful in the adhesive system of the present invention are monomeric or polymeric silane compounds having at least two reactive functional groups. More particularly, polyfunctional organosilane compounds useful in the present invention have the general formula $$R'-Si-(OR)_3.$$

where R' is an organofunctional group selected from the group consisting of amino, aminoalkyl, chloroalkyl, mercapto, vinyl, epoxy and methacrylate; and R is a hydrolyzable alkoxy group.

Examples of polyfunctional organosilane compounds of this general class include the following:
  N-2-aminoethyl-3-aminopropyltrimethoxysilane
  3-chloropropyltrimethoxysilane
  3-chloropropyltriethoxysilane
  (gamma-glycidoxypropyl)trimethoxysilane
  mercaptoethyltriethoxysilane
  3-mercaptopropyltrimethoxysilane
  3-methacryloxypropyltrimethoxysilane
  N-beta-(N-vinylbenzylamino)ethyl-gamma-aminopropyltrimethoxy-silane. monohydrogen chloride
  vinyltris(2-methoxyethoxy)silane.

Silane compounds of this type are available commercially from various sources. Examples of commercially available silanes include Dow Corning Corporation silanes Z6011, Z6020, Z6026, Z6030, Z6031, Z6032, Z6040, Z6062, Z6076, Z6082, and Union Carbide A174, A187, A189, A1100, A1110, and A1120.

An especially preferred class of polyfunctional organosilane compound are aminoalkyl silane monomers and polymers in which the amino group is attached to silicon through at least three carbon atoms. Exemplary of such compounds are the following:
  N-2-aminoethyl-3-aminopropyltrimethoxysilane
  N-2-aminoethyl-3-aminoisobutyltriethoxysilane
  N-3-aminopropyl-3-aminopropylmethyldiethoxysilane.

The preparation and use of these compounds are disclosed in Morehouse et al, U.S. Pat. No. 3,085,908.

In addition to the polyorganofunctional silane compound, the adhesive formulation also desirably includes a relatively nonpolar carrier or extender which itself may further contribute to the adhesive characteristics of the composition. Where a polyolefin, such as polyethylene, is used as the dielectric material in the cable, the relatively nonpolar extender or carrier desirably comprises a polymer or copolymer having linear hydrocarbon segments. Since polyolefins such as polyethylene are relatively inert and do not readily develop chemical bonds, adhesive bonding with the polyolefin dielectric is promoted by providing linear hydrocarbon segments which are compatible with polyolefin and which can diffuse into the molecular structure thereof to form mechanical bonds. However, the compound should desirably have a relatively nonpolar molecular structure so as to avoid or minimize dissipation of the high frequency signals.

A particularly suitable class of materials of this type are block copolymers having the general configuration A-B-A where A is a non-elastomeric block derived from a monovinyl aromatic hydrocarbon monomer and B is an elastomeric polymer block derived from either a conjugated diene monomer or a mono-olefin.

Styrene is usually employed as the monovinyl aromatic hydrocarbon monomer. Suitable conjugated dienes include butadine-1,3 and isoprene. Examples of commercially available styrene-butadine-styrene copolymers include those sold under the trademarks "Kraton D-1101 and D-1102". Kraton is a trademark of Shell Chemical Company. An example of a commercially available styrene-isoprenestyrene copolymer is "Kraton D-1107". An example of a copolymer with an olefin block is Kraton G, which is a styrene-ethylenebutylene-styrene block copolymer.

Alternatively, polyethylene may be used as the extender or carrier for the polyorganofunctional silane compound. The polyethylene may suitably contain compatible adhesive promoting additives, such as ethylene acrylic acid for example, for further contributing to the adhesive characteristics of the composition. For example, suitable results have been achieved with a blend of a linear low density polyethylene with an ethylene acrylic acid copolymer. The presence of the silane compound in the adhesive composition permits the EAA to be used in small amounts such that enhanced adhesive bonding between the metal and dielectric is obtained without significant adverse effects on the high frequency dissipation properties of the cable. This composition may be suitably applied to the conductor by extrusion.

The adhesive composition may also include additional additives such as tackifiers and stabilizers. Examples of suitable tackifiers include natural and modified rosins such as wood rosin, gum rosin, tall-oil rosin, polymerized rosin, hydrogenated rosin, dimerized rosin, pentaerythritol esters of rosin, pentaerythritol esters of hydrogenated rosin, pentaerythritol esters of polymerized rosin, glycerol esters of rosin, glycerol esters of hydrogenated rosin, methyl esters of hydrogenated rosin, polyterpene rosin. Examples of suitable stabilizers include high molecular weight hindered phenols and multifunctional phenols. The adhesive composition may also optionally include extenders or diluents such as waxes or mineral oils.

The application of the adhesive composition to the cable may be by any suitable method. One preferred method of application is in a solvent system, with the adhesive components being dissolved in a volatile organic solvent. The solvent for the adhesive system may comprise a hydrocarbon or chlorinated hydrocarbon solvent, examples of which include toluene, perchloroethylene, trichloroethylene. This method of application makes it possible to deposit a very thin layer or film of the adhesive, e.g. on the order of 0.25 to 0.5 mils in thickness, and to thereby minimize cost and adverse electrical dissipation characteristics, while still obtaining a strong adhesive bond between the conductor and the dielectric and highly effective corrosion protection for the conductor. This application method is especially suited for applying adhesives containing elastomeric block copolymers of the type described above. The silane and elastomer compound are dissolved in the solvent preferably at proportions of about one part silane to about ten to twenty-five parts by weight elastomer compound.

Alternatively, the adhesive composition may be applied by extrusion as a hot melt adhesive. This application is especially suited for applying adhesives containing polyethylene polymers or copolymers as described above.

The protective adhesive composition may be used in the cable on any metallic conductor surface which is subject to corrosion. Thus, for example, the adhesive may be used at the interface between the inner conductor and the dielectric, at the interface between the dielectric and the surrounding metallic outer conductor or sheath, at the interface between the outer conductor or sheath and any surrounding polymer jacket or insulation, or at any combination of the above.

Referring now more particularly to the drawing, the reference character 10 in FIG. 1 generally indicates a coaxial cable constructed in accordance with the present invention. The cable includes a single centrally located inner conductor 11, formed of a suitable electrically conductive metallic material. In the embodiment illustrated, the inner conductor 11 is formed of copper-clad aluminum, although other metallic materials may be employed if desired, such as solid copper for example. Surrounding the inner conductor 11 is a dielectric material 12, formed of a material of suitable electrically insulating characteristics. Suitable dielectric materials include solid or foamed olefin or halogenated olefin polymers such as polyethylene, polypropylene, fluorinated ethylene/propylene copolymers, poly(tetrafluoroethylene), perfluoroalkoxy ethylene polymers, and chlorotrifluoroethylene polymers. The dielectric 12 in the illustrated embodiment is a foamed polyethylene polymer and is surrounded by a metallic outer conductor or sheath 14. In the particular embodiment illustrated, the metallic outer conductor 14 is of a seamless tubular aluminum construction, although the sheath may be of other constructions such as welded aluminum strip or a metallic foil.

The interface between the surface of the metallic inner conductor 11 and the dielectric 12, there is provided a thin continuous film or layer of a protective adhesive composition indicated by the reference character 20.

Figure 2:
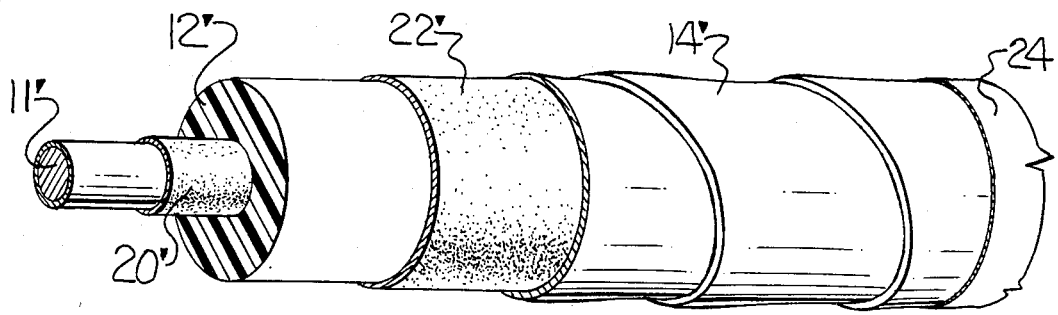
FIG. 2 is a view similar to FIG. 1 showing another form of a coaxial cable in accordance with the invention.

FIG. 2 illustrates another type of cable in accordance with the present invention in which there is provided a metallic inner conductor 11', which is surrounded by a non-conductive unexpanded polyethylene insulation or dielectric 12'. Surrounding the dielectric 12' is a metallic outer conductor 14' formed of a thin strip of aluminum foil helically wound around the dielectric 12. At the interface between the surface of the metallic inner conductor 11' and the dielectric 12', there is provided a thin layer of a protective adhesive composition, as indicated by the reference character 20'. Also, at the interface between the dielectric 12' and the metallic foil outer conductor 14', a thin layer 22 of protective adhesive is provided bonding the metallic outer conductor 14' to the dielectric 12'. A protective jacket 24 of polyethylene is provided surrounding the outer conductor 14'.

The following examples are given for purposes of illustrating the invention and how to practice the same. These examples are not intended to be understood as limiting the scope of the invention. All parts, percentages and ratios are by weight, unless otherwise indicated.

EXAMPLE 1

A solvent-based adhesive formulation was prepared as follows:

| | |
|---|---|
| Silane Z-6020 [N—(beta-aminoethyl)-gamma-aminopropyltrimethoxysilane] | 4.7% |
| Kraton D-1102 [styrene-butadiene-styrene copolymer] | 14.3% |
| Toluene | 81% |

Figure 3:
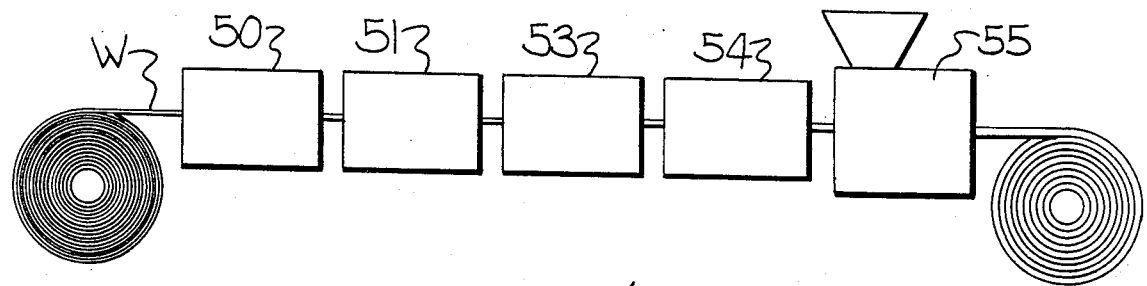
FIG. 3 is a block schematic illustration of an apparatus and process for producing the cable.

The adhesive composition was applied to a copper-clad aluminum conductor wire by an apparatus similar to that illustrated in FIG. 3. The wire W was advanced past a heater 50 and preheated to an elevated temperature, and then directed through an applicator unit 51 where the adhesive composition was sprayed onto the wire. Upon contacting the heated wire, the solvent evaporated. The wire was then directed through a cooling trough 53 filled with water to further cool the wire. The wire was then directed through a dryer 54 where it was heated and dried and the wire then passed through an extruder 55 where a foamed polyethylene dielectric was extruded onto the wire. In a subsequent operation (not shown), a seamless tubular aluminum sheath was applied around the core in a manner known in the art to complete the coaxial cable.

EXAMPLE 2

An adhesive formulation was prepared as follows:

| | |
|---|---|
| Silane Z-6020 [N—(beta-aminoethyl)-gamma-aminopropyltrimethoxysilane] | 4.4% |
| Kraton D-1102 [styrene-butadiene-styrene copolymer] | 13.4% |
| Piccofyn A-100 [hydrocarbon resin tackifier] | 6.2% |
| Toluene | 76% |

The adhesive was applied to a copper-clad aluminum conductor wire in a manner similar to that described in Example 1 and a coaxial cable was manufactured therefrom.

EXAMPLE 3

An adhesive formulation was prepared as follows:

| | |
|---|---|
| low-density polyethylene | 78.8% |
| ethylene acrylic acid | 19.2% |
| Silane Z-6020 [N—(beta-aminoethyl)-gamma-aminopropyltrimethoxysilane] | 1.986% |

This adhesive formulation was heated to a molten state and extruded onto a copper conductor wire using a hot melt extrusion apparatus of the type conventionally used in the manufacture of coaxial cable. The thus coated conductor wire was then used for manufacturing a coaxial cable in a manner similar to that described in Example 1.

EXAMPLE 4

Coaxial cables manufactured as described in Examples 1–3 were tested for center conductor corrosion using the salt fog test (ASTM: B-117) and compared with controls manufactured in accordance with the conventional practice using EAA adhesive for the center conductor. The following results were observed:

| No. | Coating System | Length of Conductor Corrosion (inches) | | | | | |
|---|---|---|---|---|---|---|---|
| | Test Specimen: | 1 | 2 | 3 | 4 | 5 | 6 |
| 1 | as in Example 1 | .39 | .08 | .31 | .16 | .39 | .00 |
| 2 | as in Example 2 | .24 | .31 | .16 | .31 | .39 | .00 |
| 3 | as in Example 3 | .20 | .12 | .24 | .43 | .31 | .08 |
| 4 | EAA control | .63 | .55 | .47 | .51 | .63 | .43 |

EXAMPLES 5–9

Examples of other adhesive formulations are as follows:

| Ingredient | Example 5 | 6 | 7 | 8 | 9 |
|---|---|---|---|---|---|
| | Parts by Weight | | | | |
| Silane Z-6030 [gamma-methacryloxypropyltrimethoxysilane] | 5 | — | — | — | — |
| Silane Z-6032 [N—2-(N—vinylbenzylamino) ethyl-gamma-aminopropyl trimethoxysilane.monohydrogen chloride] | — | 5 | — | — | — |
| Silane Z-6040 [gamma-glycidoxypropyltrimethoxysilane] | — | — | 5 | — | — |
| Silane Z-6076 [3-chloropropyltrimethoxysilane] | — | — | — | 5 | — |
| Silane Z-6082 [(2-methoxyethoxy) silane] | — | — | — | — | 5 |
| Kraton D-1102 [styrene-butadiene-styrene copolymer] | 15 | 15 | — | — | — |
| Kraton D-1107 [styrene-isoprene-styrene copolymer] | — | — | 15 | 15 | 15 |
| Toluene | 80 | 80 | 80 | 80 | 80 |

In the drawings and specification, there have been set forth some preferred embodiments of the invention, and although specific terms are employed, they are used in a generic and descriptive sense only and not for purposes of limitation.

That which is claimed is:

1. A cable comprising at least one metallic inner conductor, a dielectric material surrounding the at least one inner conductor, a metallic outer conductor surrounding the dielectric material and the at least one inner conductor, and an adhesive coating provided at the interface between at least one of said conductors and said dielectric material and forming an adhesive bond therebetween and also serving to prevent corrosion of the metallic conductor, said adhesive coating comprising a polyfunctional organosilane compound reacted with the metallic surface of the conductor and providing corrosion resistance thereto and also cooperating with said dielectric material to promote bonding between the conductor and the dielectric material, said polyfunctional organosilane compound including organofunctional groups selected from the group consisting of amino, aminoalkyl, chloroalkyl, mercapto, vinyl, epoxy and methacrylate.

2. A cable according to claim 1 wherein said polyfunctional organosilane compound comprises an aminoalkyl silane in which the amino group is attached to the silicon through at least three carbon atoms.

3. A cable according to claim 1 wherein said adhesive coating additionally comprises a polymer containing linear hydrocarbon segments serving as a carrier for the silane compound and cooperating therewith to further promote bonding between the conductor and the dielectric material.

4. A cable according to claim 3 wherein said polymer comprises a block copolymer including a nonelastomeric polymer block derived from a monovinyl aromatic hydrocarbon monomer and an elastomeric polymer block derived from a member selected from the group consisting of a conjugated diene and a rubbery mono-olefin.

5. A cable according to claim 3 wherein said polymer comprises a blend of polyethylene with a copolymer of ethylene and an ethylenically unsaturated carboxylic acid.

6. A cable according to claim 1 wherein said adhesive coating composition is provided at the interface between said at least one inner conductor and the dielectric material.

7. A cable according to claim 6 wherein said adhesive coating composition is also provided at the interface of said outer conductor and the dielectric material.

8. A cable comprising at least one metallic inner conductor, a dielectric material surrounding the at least one inner conductor, a metallic outer conductor surrounding the dielectric material and the at least one innerconductor, and an adhesive coating provided at the interface between at least one of said conductors and said dielectric material and forming an adhesive bond therebetween and also serving to prevent corrosion of the metallic conductor, said adhesive coating comprising (a) a polyfunctional silane compound having the general formula $$R'—Si—(OR)_3$$

where

R' is an organofunctional group selected from the group consisting of amino, aminoalkyl, mercapto, vinyl, epoxy and methacrylate; and R is a hydrolysable alkoxy group; and (b) a block copolymer of the general configuration A-B-A where A is a non-elastomeric block derived from a monovinyl aromatic hydrocarbon monomer; and B is an elastomeric polymer block derived from a member selected from the group consisting of a conjugated diene and a mono-olefin.

9. A cable according to claim 8 wherein (a) comprises an aminoalkyl silane and (b) comprises a styrene-butadiene-styrene copolymer.

10. A coaxial cable comprising an inner conductor having an outer surface of copper, a polymer dielectric material surrounding said inner conductor, a tubular metallic sheath surrounding said polyolefin dielectric, and a thin adhesive coating provided at the interface between said inner conductor and said dielectric, said coating comprising an amino functional silane reacted with the copper surface of said inner conductor to provide corrosion resistance thereto, and a polymer having linear hydrocarbon segments adhering to said dielectric and to said inner conductor and promoting adhesive bonding therebetween.

11. A cable according to claim 10 additionally including a thin adhesive coating provided at the interface between said metallic sheath and said dielectric, said adhesive coating also comprising an amino functional silane and a polymer having linear hydrocarbon segments.

12. A cable comprising at least one metallic inner conductor, a dielectric material surrounding the at least one inner conductor, a metallic outer conductor surrounding the dielectric material and the at least one inner conductor, and an adhesive coating provided at the interface between at least one of said conductors and said dielectric material and forming an adhesive bond therebetween and also serving to prevent corrosion of the metallic conductor, said adhesive coating comprising (a) a polyfunctional silane compound having the general formula $$R'—Si—(OR)_3$$

where

R' is an organofunctional group selected from the group consisting of amino, aminoalkyl, mercapto, vinyl, epoxy and methacrylate; and R is a hydrolysable alkoxy group; and (b) a linear low density polyethylene polymer; and (c) a copolymer of ethylene and an ethylenically unsaturated carboxylic acid.

13. In a method of producing a cable of the type having at least one metallic inner conductor, a dielectric material surrounding the at least one inner conductor, and a metallic outer conductor surrounding the dielectric material and the at least one inner conductor, the improvement which comprises applying at the interface between at least one of said conductors and the dielectric an adhesive coating composition comprising a polyfunctional organosilane compound, said polyfunctional organosilane compound including organofunctional groups selected from the group consisting of amino, aminoalkyl, chloroalkyl, mercapto, vinyl, epoxy and methacryate, and reacting the polyfunctional organosilane compound with the metallic surface of the conductor to provide corrosion resistance thereto and to promote bonding between the conductor and the dielectric.

14. A method according to claim 13 wherein the polyfunctional organosilane compound comprises an aminoalkyl silane in which the amino group is attached to the silicon through at least three carbon atoms.

15. A method according to claim 13 wherein the adhesive coating additionally comprises a polymer containing linear hydrocarbon segments serving as a carrier for the silane compound and cooperating therewith to further promote bonding between the conductor and the dielectric material.

16. A method according to claim 15 wherein said polymer comprises a block copolymer including a nonelastomeric polymer block derived from a monovinyl aromatic hydrocarbon monomer and an elastomeric polymer block derived from a member selected from the group consisting of a conjugated diene and a rubbery mono-olefin.

17. A method according to claim 15 wherein said polymer comprises a blend of polyethylene with a copolymer of ethylene and an ethylenically unsaturated carboxylic acid.

18. A method according to claim 13 wherein said step of applying an adhesive coating comprises applying the adhesive composition to the inner conductor and thereafter applying the dielectric material in surrounding relation to the adhesive-coated inner conductor.

* * * * *